S. A. TEEL.
EXPANDING BRAKE BAND GUIDE.
APPLICATION FILED APR. 4, 1917.

1,245,065. Patented Oct. 30, 1917.

WITNESSES
H. T. Walker
C. Bradway

INVENTOR
S. A. Teel
BY Munn & Co
ATTORNEYS

UNITED STATES PATENT OFFICE.

STEWARD A. TEEL, OF BANGOR, PENNSYLVANIA.

EXPANDING BRAKE-BAND GUIDE.

1,245,065.      Specification of Letters Patent.      Patented Oct. 30, 1917.

Application filed April 4, 1917. Serial No. 159,831.

*To all whom it may concern:*

Be it known that I, STEWARD A. TEEL, a citizen of the United States, and a resident of Bangor, in the county of Northampton and State of Pennsylvania, have invented a new and Improved Expanding Brake-Band Guide, of which the following is a full, clear, and exact description.

This invention relates to brake bands of the expansion type, and it deals particularly with that type of brake in which the free ends of the band are spread apart by an interposed rotary cam.

The invention has for its general objects to improve brakes of this character so as to be more reliable and efficient in use, of durable and substantial design, and capable of producing a more uniform gripping action on the brake drum.

A more specific object of the invention is the provision of a guide for preventing the cam in rotating from throwing one end of the brake band inwardly, whereby the cam will produce a uniform outward action on both ends of the brake band.

With such objects in view, and others which will appear as the description proceeds, the invention comprises various novel features of construction and arrangement of parts which will be set forth with particularity in the following description and claims appended hereto.

In the accompanying drawings, which illustrates one embodiment of the invention and wherein similar characters of reference indicate corresponding parts in all the views, Figure 1 is a face view of a brake with the drum removed;

Figure 1:
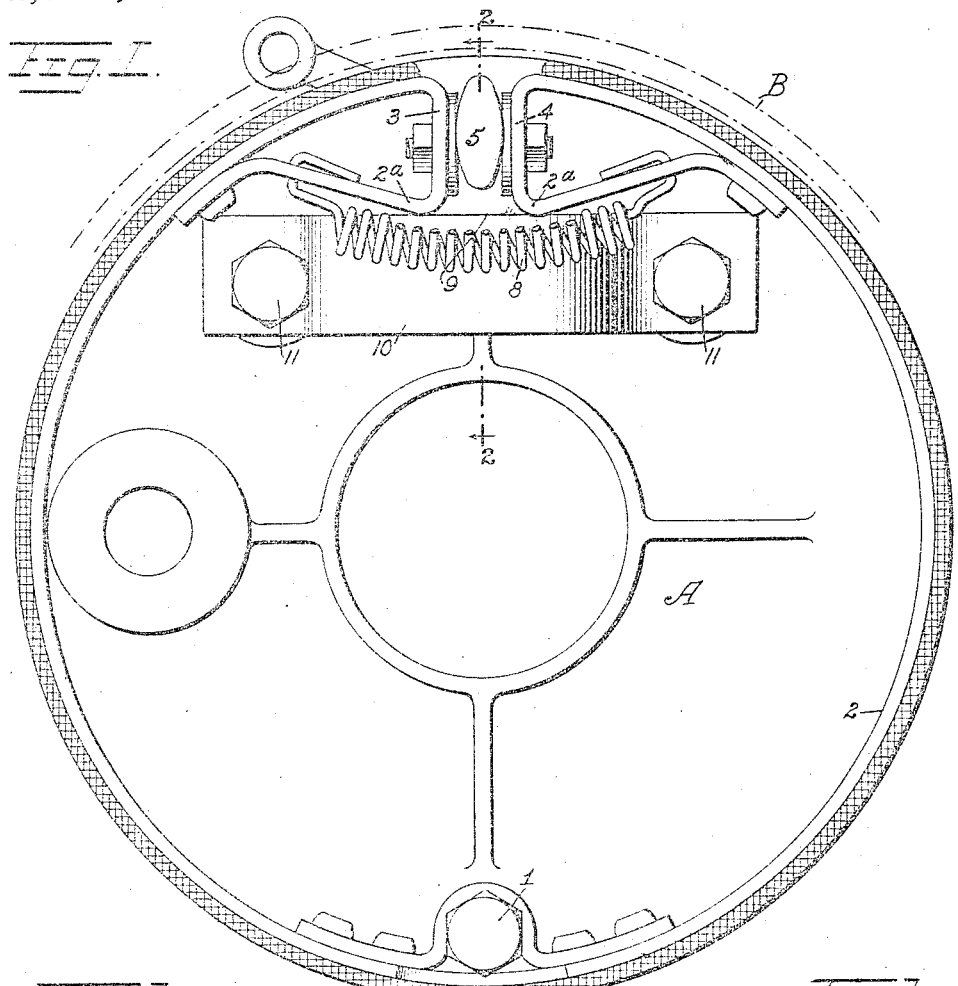
Figure 2:
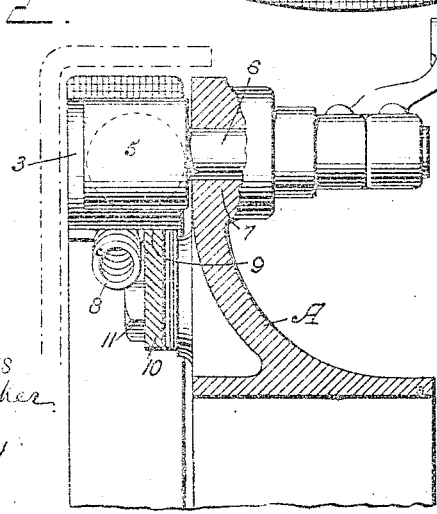
Fig. 2 is a vertical section on the line 2—2, Fig. 1.
Figure 3:
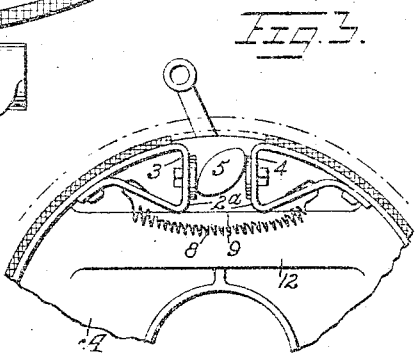
Fig. 3 is a fragmentary view showing the cam in the position to expand the brake band.

Referring to the drawing, A designates the disk or plate of a brake which has loosely fastened at 1 the central portion of the brake band 2. The ends 3 and 4 of the brake band lie at opposite sides of the band-expanding cam 5, which cam has its shaft 6 journaled in a bearing 7 of the plate A. The ends of the brake band are held toward each other and in engagement with the cam by any suitable means, such as a spring 8. When the cam turns from the position shown in Fig. 1 to that shown in Fig. 3, the end 4 of the brake band has a tendency to be thrown inwardly by the wiping action of the cam thereon, so that the terminal portion 4 of the brake band will not effectively grip the brake drum B. To overcome this a shoulder or surface 9 is provided on the plate A, and the doubled portions of the brake band have a sliding engagement with this shoulder as the band expands and contracts. In other words, this shoulder prevents the ends of the brake band from moving inwardly, no matter which way the cam 5 is oscillated. This shoulder 9 may be formed by the edge of a strip of metal 10, Figs. 1 and 2, secured by bolts 11 to the plate A, or it may be formed by a ledge 12 cast on the plate A, as shown in Fig. 3.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. In a brake, the combination of a support, a brake band thereon, an actuating cam engaged with the ends of the brake band, for expanding the latter, and means for preventing an inward movement of the ends of the brake band.

2. In a brake the combination of a support, a brake band thereon, an actuating cam engaged with the ends of the brake band, for expanding the latter, and means carried by the support and in constant engagement with the ends of the brake band for preventing any inward movement of the ends of the brake band.

3. In a brake, the combination of a support, a brake band thereon, an actuating cam engaged with the ends of the brake band, for expanding the latter, and a guide member secured to said support and in constant engagement with the ends of said brake band for preventing the movement of said ends toward the center of the brake band.

4. In a brake, the combination of a support, a brake band thereon, an actuating cam engaged with the ends of the brake band, for expanding the latter, and a guide plate carried by the support and disposed at right angles to a radial line running through the center of the cam, said guide plate having an edge in constant engagement with the ends of the brake band, for preventing the inward movement of the ends of the brake band.

5. In a brake, the combination of a support, a brake band thereon, an actuating cam engaged with the ends of the brake band, for expanding the latter, and a guide plate carried by the support and disposed at right angles to a radial line running through the center of the cam, said guide plate having an edge in constant engagement with the ends of the brake band, for preventing the inward movement of the ends of the brake band, said guide plate being secured to said support at its ends and being bowed out away from said support, said brake band ends engaging the bowed portion of the guide plate.

6. In a brake, the combination of a support, a brake band thereon, an actuating cam engaged with the ends of the brake band, for expanding the latter, a guide plate carried by the support and disposed at right angles to a radial line running through the center of the cam, said guide plate having an edge in constant engagement with the ends of the brake band, for preventing the inward movement of the ends of the brake band, said guide plate being secured to said support at its ends and being bowed out away from said support, said brake band ends engaging the bowed portion of the guide plate, and a spring connected with the ends of the brake band, for holding the ends against the cam.

STEWARD A. TEEL.